Aug. 10, 1965  C. D. GRABER ETAL  3,199,658
POWER FILING APPLIANCE
Filed June 24, 1963  5 Sheets-Sheet 1

INVENTORS
Carl D. Graber and
BY Raymond L. Alvarez
Frease, Bishop, Johns & Schick
ATTORNEYS INVENTORS
Carl D. Graber and
Raymond L. Alvarez
BY
Frease, Bishop, Johns & Schick
ATTORNEYS

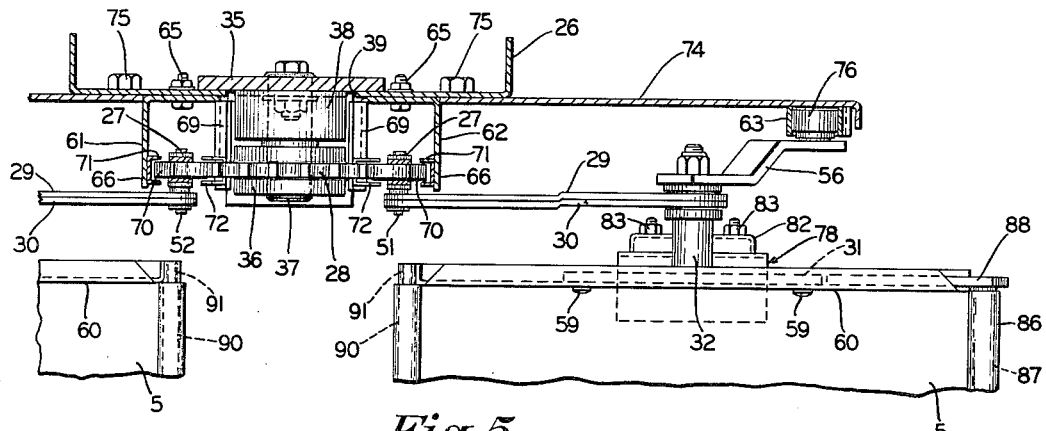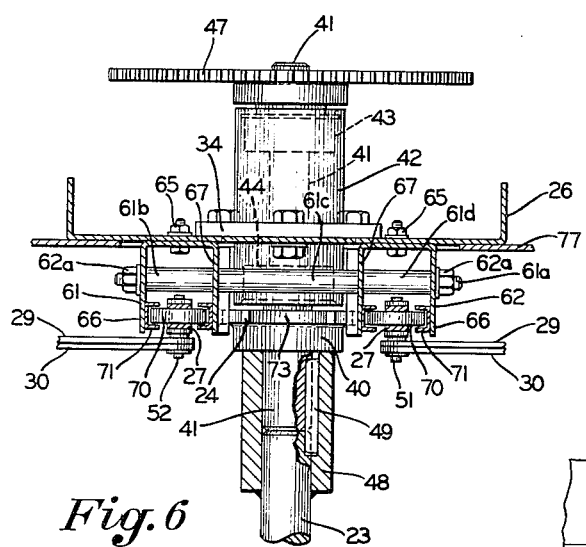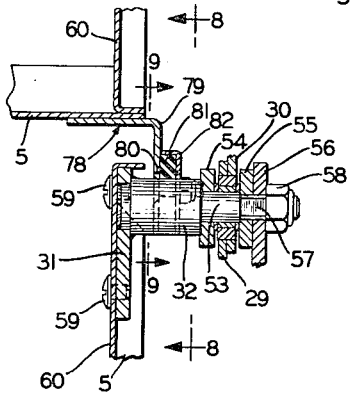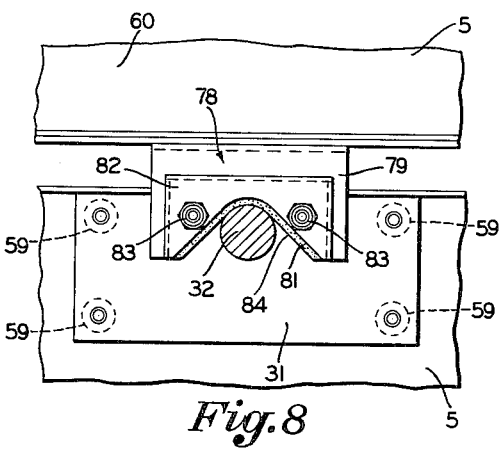

Aug. 10, 1965
C. D. GRABER ETAL
3,199,658
POWER FILING APPLIANCE
Filed June 24, 1963
5 Sheets-Sheet 5
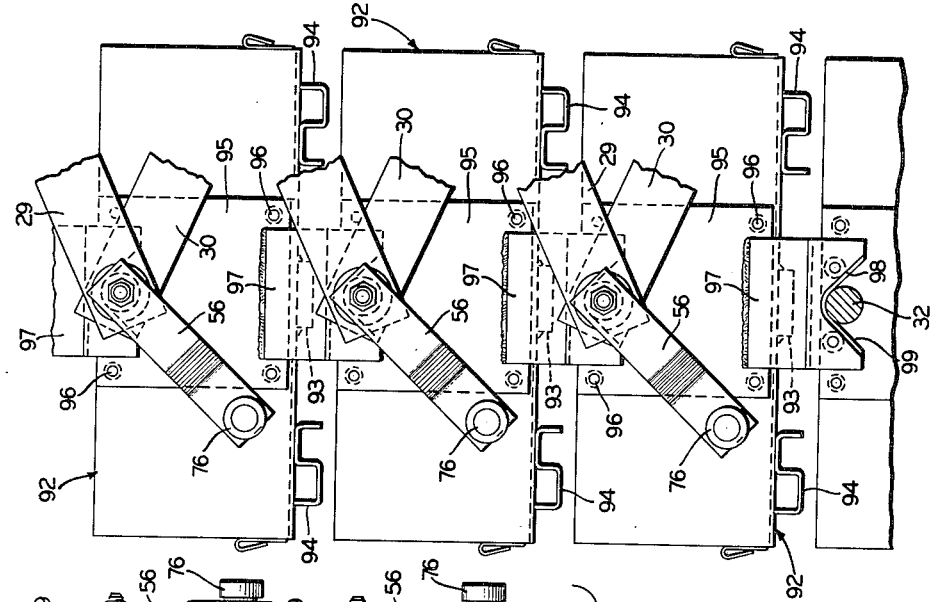
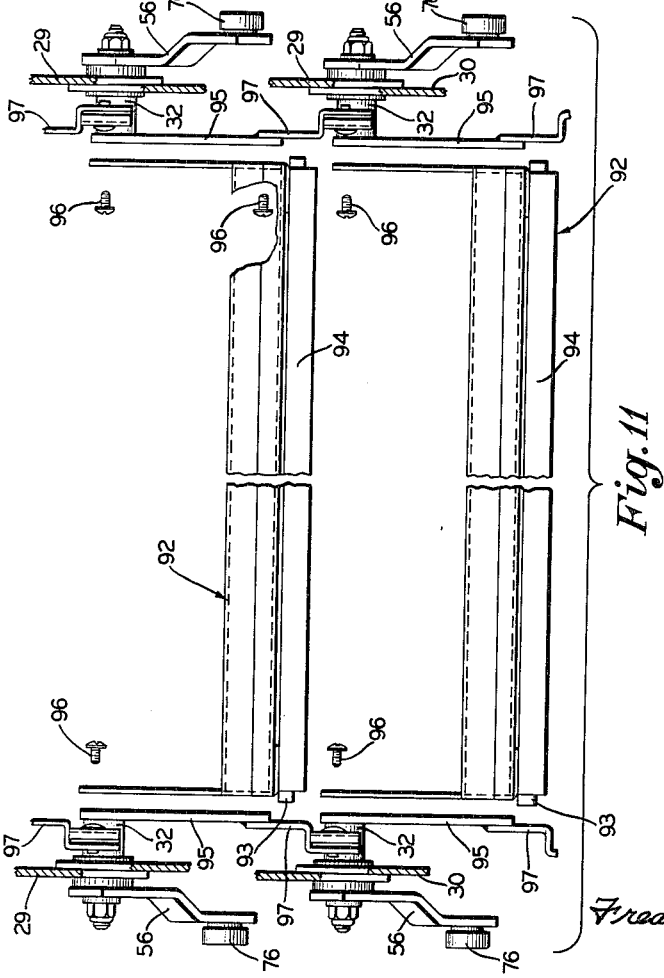
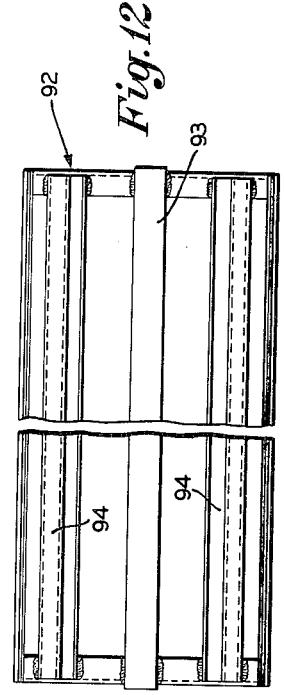
INVENTORS
Carl D. Graber and
Raymond L. Alvarez
BY
Frease, Bishop, Johns & Schick
ATTORNEYS United States Patent Office 3,199,658
Patented Aug. 10, 1965

3,199,658
POWER FILING APPLIANCE
Carl D. Graber, Orrville, and Raymond L. Alvarez, Canton, Ohio, assignors to Diebold, Incorporated, Canton, Ohio, a corporation of Ohio
Filed June 24, 1963, Ser. No. 289,822
14 Claims. (Cl. 198—137)

The invention relates to a mechanized power-operated filing appliance of a type in which a plurality of card-carrying pans are supported on pan-support chains and moved in an endless orbit of travel, clockwise or counterclockwise, so that a selected pan can be moved rapidly to a work station, and which filing appliance may extend substantially from the floor to the ceiling of a room in which it is located. More particularly, the invention pertains to a file or filing appliance which is too large to move through doorways or windows of conventional size and which is shipped in smaller subassemblies that are readily assembled at the location where the file is to be used.

The development of mechanized filing appliances for storage of large volumes of records in a readily available location in some instances has involved the used of an electric motor drive for otherwise manually operable files of relatively small construction. As the efficiency of such files improved, larger power-driven files were provided which had greatly increased capacity for storage of records on a given floor space. Accordinly, the size of such files has increased until the only limit in size of the files is the size of the conventional doorway or window through which the files are moved for installation.

A room-high filing appliance can be readily installed if it is shipped in knocked-down subassemblies packaged in a number of smaller containers which may be handled easily and moved into a room. Heretofore problems related to the size of a file have existed in the field of mechanized filing appliances, such as excessive noise, instability, vibration resulting from motion of the parts, and excessive weight for a given floor area.

The noise created by the operation of a file increases with the size of the file because there are more moving parts. As the size of the file increases, an undesirable noise level is developed, the source of which must be eliminated or minimized in order to make the file a more desirable product. Excessive noise may be eliminated or minimized by providing the pan support chains with rollers composed of noise-absorbing material such as Delrin. In addition, the noise of contact between the pans as they move in the vertical direction may be minimized by providing noise-absorbing material such as rubber at the zones of contact.

Moreover, mechanized filing appliances have a plurality of record-card-carrying pans that occupy substantially the entire volume of space between the floor and a ceiling of a room. The pans are supported at opposite ends on continuous drive chains which are mounted on and between vertically spaced sprockets on vertical support end members, and must be stablized during chain movement. Where the file is shipped in knocked-down subassemblies the problem of readily assembling the subassemblies and providing for rigidity between the vertical end frame members is greater than where a file is shipped as a rigid unit.

Associated with the foregoing is the problem of greatly increased weight due to the increased size of the file. It is necessary to provide a file having a minimum weight for a given floor area without sacrificing file rigidity and stabilized movement. Stabilized movement avoids vibration noise and provides a smoothly operating unit.

Reinforcement means also is provided to prevent the record-card-carrying pans from twisting out of shape due to unbalanced loads. The weight of a file may be reduced by making the card-carrying pans of lighter gauge sheet metal. Where the pans are of unusual length, however, the lighter gauge sheet metal results in pan twisting between the ends of the pans due to uneven or unequal loading. This can be avoided by providing torsion-resistant means for stiffening the pans. Such stiffening means may be incorporated in the pan wall construction of each pan to reduce the over-all weight of the file without sacrificing rigidity and stabilization.

The pans of prior mechanized files heretofore have been suspended from a cross shaft at the top of each pan which reduced the effective card-carrying height of each pan and thereby reduced the over-all file capacity. This difficulty increases and multiplies as the pans become shallower and their number is increased. This problem is satisfied in accordance with the invention by eliminating a pan supporting cross shaft at the top of any pan.

Mechanized filing equipment must be equipped with stabilizing means for the pans during pan movement in order to prevent pan upsetting incident to uneven pan loading and pan swinging during pan movement. Prior stabilizing means incorporated in mechanized file construction, particularly in the vertical chain runs, has not been fully effective unless close tolerances in pan spacing are maintained at all times. Further, wear on the parts and chain stretch may reduce the efficiency of the stabilizing means. Further, operational and vibration noises may be augmented by such wear or a chance in tolerance limits present.

These stabilizing problems are overcome in the improved construction by providing a yielding, compressible, stabilizing, camming connection between adjacent pans which clamps the pans together against relative movement and for movement as a stack during pan movement along the vertical runs of the path of travel.

The installation of knocked-down subassemblies of a file may be simplified by using a single cross shaft for driving the pans which has telescopic fittings at both ends for engagement with stub shafts on certain sprockets for the pan-support chains. Each chain has pan-support arm means for each pan end. The assembly and disassembly of a file is expedited by detachably connecting the pan-support means to the end walls of the pan with removable bolt means at each end wall of each pan. The separated pans may then be shipped in a container different from the container in which each end support means is shipped. As a result, a number of easily handled and readily assembled subassemblies is provided.

Accordingly, it is a general object of this invention to provide a power filing appliance composed of a number of readily assembled subassemblies which are shipped in a number of separate containers for ready handling and movement through doorways of conventional size to places of final assembly.

It is another object of this invention to provide a power filing appliance having means for facilitating the assembly and spacing of the record-carrying pans during installation of a file.

It is another object of this invention to provide a power filing appliance having a frame construction readily assemblied from subassemblies into a rigid smoothly operating unit.

It is another object of this invention to provide a power filing appliance with improved noiseless stabilizing means particularly for the vertical movement of card-carrying pans as they move between the upper and lower ends of their orbit of travel.

It is another object of this invention to provide a power filing appliance having increased capacity and reduced overall weight by the provision of card-carrying pans composed of light gauge sheet metal which pans are provided with torsion-resistant means for preventing twisting due to uneven loading of the pans.

It is another object of this invention to provide a power filing appliance having a single readily detachable drive shaft extending between certain sprocket stub shafts on the spaced vertical end frame members, preferably at the lower end of the file.

It is another object of this invention to provide a power filing appliance having means for silencing the operation of the moving parts of the file.

It is another object of this invention to provide a power filing appliance having corresponding end frame members with interchangeable parts.

It is another object of this invention to provide a power filing appliance which eliminates the pan supporting cross shafts of prior file constructions and thereby reduces the effective height of each pan and increases the capacity of the file.

Also, it is an object of this invention to provide an improved power filing appliance in which two or more of the foregoing new features are incorporated in a cooperative manner in the file construction.

Finally, it is an object of this invention to provide a novel and improved power filing appliance which is of economical manufacture, which is adapted for assembly and shipment in smaller subassemblies, and which requires a minimum amount of maintenance and repair.

These and other objects and advantages apparent to those skilled in the art from the following description and claims may be obtained, the stated results achieved, and the described difficulties and problems overcome and solved by the parts, elements, constructions, mechanisms, combinations, subcombinations, and arrangements, which comprise the present invention, the nature of which is set forth in the following general statement, preferred embodiments of which—illustrative of the best mode in which applicants have contemplated applying the principles—are set forth in the following description and shown in the drawings, and which are particularly and distinctly pointed out and set forth in the appended claims forming part hereof.

The nature of the improvements of the present invention may be stated in general terms as including a filing appliance having a plurality of card-carrying pans movable in an endless orbit of travel, means at each end of the pans for supporting the pans and including a motor for moving the pans about said orbit of travel, said means including a continuous drive chain having pan-supporting arms extending from the chain to each end of each pan, the means also including a support plate detachably secured to the end wall of each pan and including a trunnion extending from each plate and pivoted to the pan-support arms at each end of each pan, means for stabilizing the pans during their movement about the orbit of travel and including track means at upper and lower ends of the orbit of travel, said stabilizing means also including a track-engaging lever extending from at least one end of each pan, said stabilizing means also including a member extending below the undersurface of each pan and having an inverted V-shaped notch engageable with the trunnion of the next lower pan, each inverted V-shaped notch having a rubber-lined camming surface interengaging and clamping said trunnion, each chain having chain guide-track means coextensive with the vertical portions of the path of chain travel and disposed between the sprockets, each chain having spaced rollers composed of material of great resistance to friction and low coefficient of friction and being engageable with the walls of the guide-track means, each pan having a longitudinal torsion-resistant means associated with a wall and extending between opposite ends of the pan, and the pan-supporting arms being pivotally connected to said spaced rollers.

By way of example, the improved power filing appliance construction is shown in the accompanying drawings in which:

FIG. 5 is an enlarged horizontal sectional view taken on the line 5—5 of FIG. 3;

FIG. 6 is an enlarged horizontal sectional view showing the manner in which the drive shaft is detachably secured at one end to one pan-support subassembly and taken on the line 6—6 of FIG 3;

FIG. 7 is a fragmentary vertical sectional view taken on the line 7—7 of FIG. 3;

FIG. 8 is a fragmentary vertical sectional view taken on the line 8—8 of FIG. 7;

FIG. 9 is a fragmentary vertical sectional view taken on the line 9—9 of FIG. 7;

FIG. 10 is a fragmentary vertical sectional view of a plurality of another embodiment of card-support pans;

FIG. 11 is a fragmentary exploded elevational view of a pair of pans of FIG. 10, and showing the manner in which the pans are separated from the pan-support means at opposite ends thereof; and FIG. 12 is a bottom view of one of the pans of the embodiment shown in FIGS. 10 and 11.

Similar numerals refer to similar parts throughout the drawings.

Figure 1:
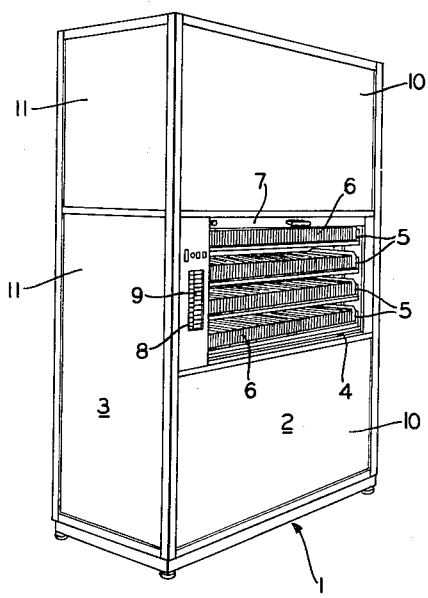
FIGURE 1 is a perspective view of a power filing appliance with an access opening.

In FIG. 1 a power filing appliance or file is generally indicated at 1 and includes a front wall 2 and an end wall 3. The front wall 2 includes an opening 4 through which access is provided to pans 5 on which file records or record cards 6 are stored. A movable cover 7 is provided for the opening 4 and may be lowered to close the opening. A control panel 8 is provided at one end of the opening 4 and a number of pan-selector switches 9 are provided on the panel. The number of switches corresponds to the number of pans 5.

Figure 4:
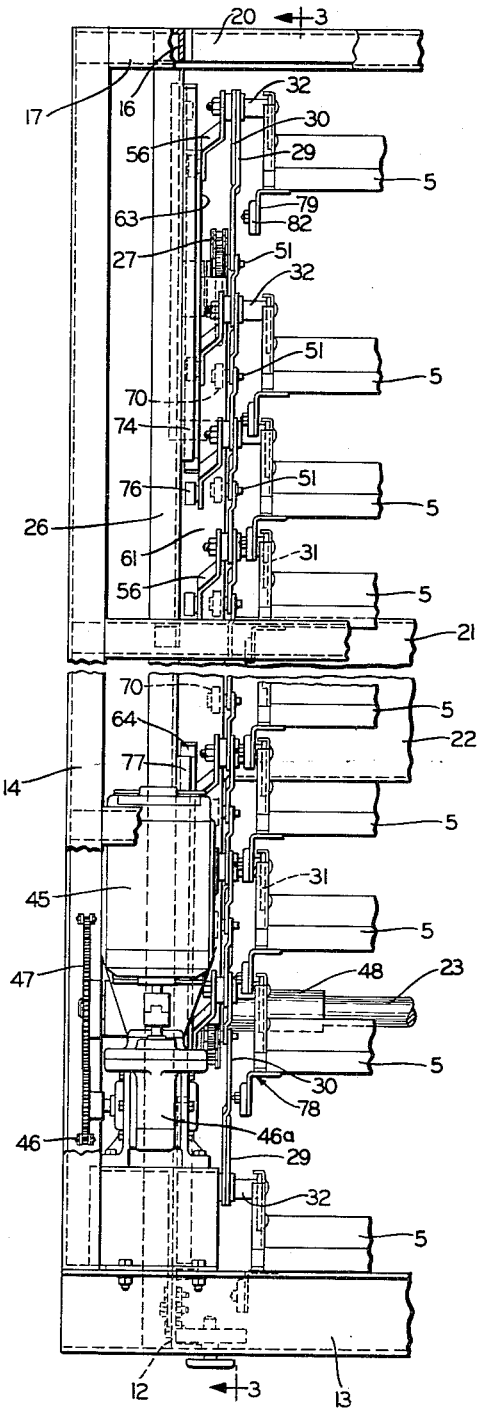
FIG. 4 is a fragmentary elevational view partly in section showing the manner in which the ends of the pans are attached to one side of the pan-support subassembly which includes the reversible motor.

As shown in FIG. 1, the file includes outer housing panels such as front panels 10 and end panels 11 which are detachably mounted on a frame. The frame is rectangular and is shown more particularly in FIGS. 2, 3, and 4, and includes base frame members 12 and 13, corner frame members 14 and 15, as well as top frame members 16 and 17. The housing panels 10 and 11 are detachably mounted onto the frame members 12–17.

The pans 5 (FIG. 2) are mounted in closely stacked positions for movement through an endless orbit of travel within the file, which orbit includes front and rear vertical portions as well as upper and lower arcuate portions. Means for supporting and moving the pans 5 through said orbit are provided at opposite ends of the pans and are generally indicated at 18 and 19.

Reinforcing members or stretchers 20, 21, and 22 are detachably connected to and extend between the pan-support means 18 and 19. A single drive shaft 23 extends between chain drive sprockets 24 (FIG. 3) and 25 (FIG. 2).

The pan-support means 18 and 19 are similar in construction and operation. Each means includes a vertical support or channel member 26, a drive chain 27, an upper chain sprocket 28, and a lower sprocket 24 or 25. In addition, each means 18 and 19 includes V-arranged pan-support arms 29 and 30, a plate 31, and a trunnion 32 for each pan 5.

The vertical support members 26 are detachably secured, such as by bolts 33, to the base frame members 12. The vertical channels 26 are reinforced by the interconnecting stretchers 20, 21, and 22 by detachable means such as bolts.

Figure 2:
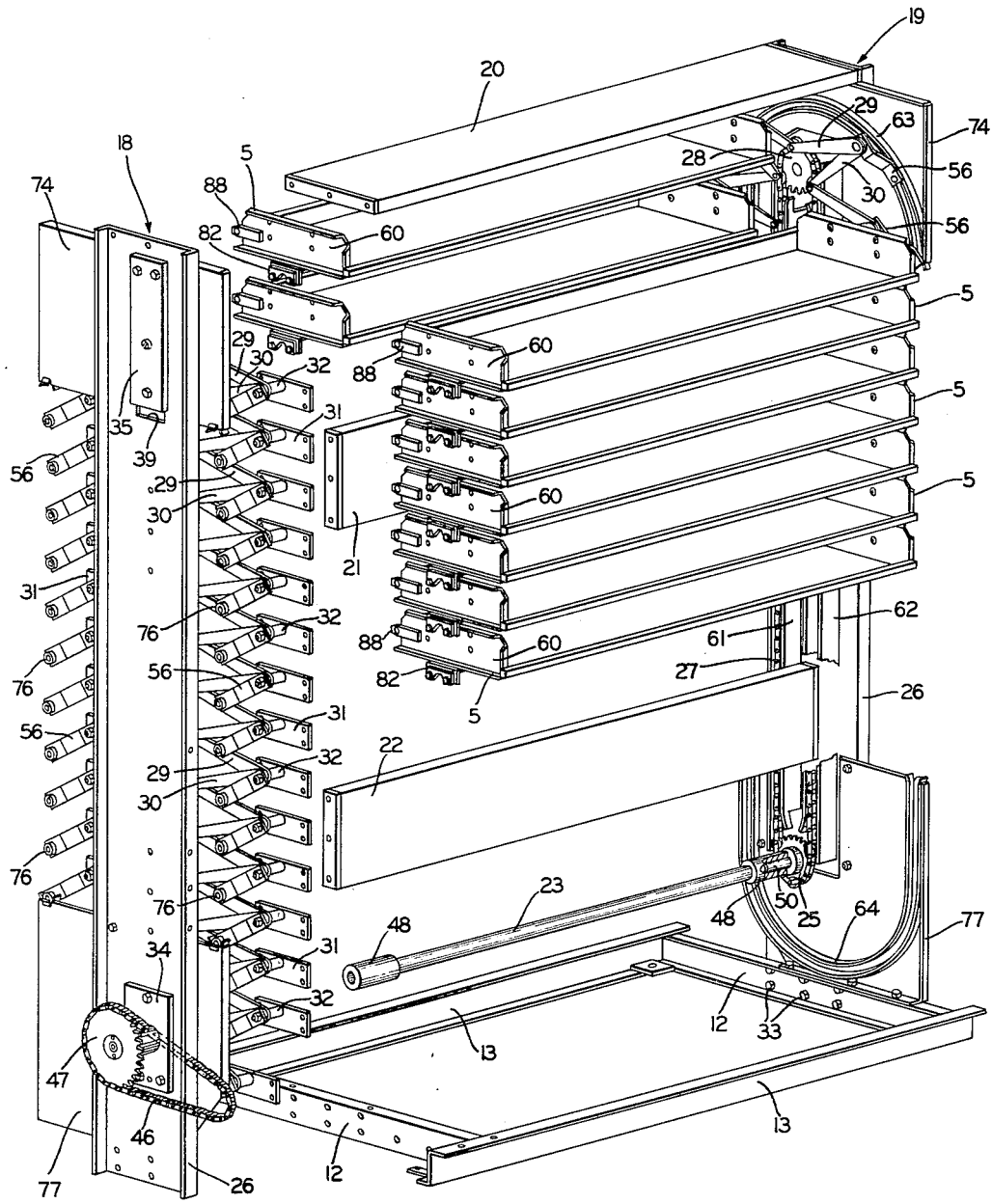
FIG. 2 is a perspective view showing only a portion of the card-carrying pans, and showing one pan-support end subassembly in spaced relation with respect to the corresponding ends of the pans.
Figure 3:
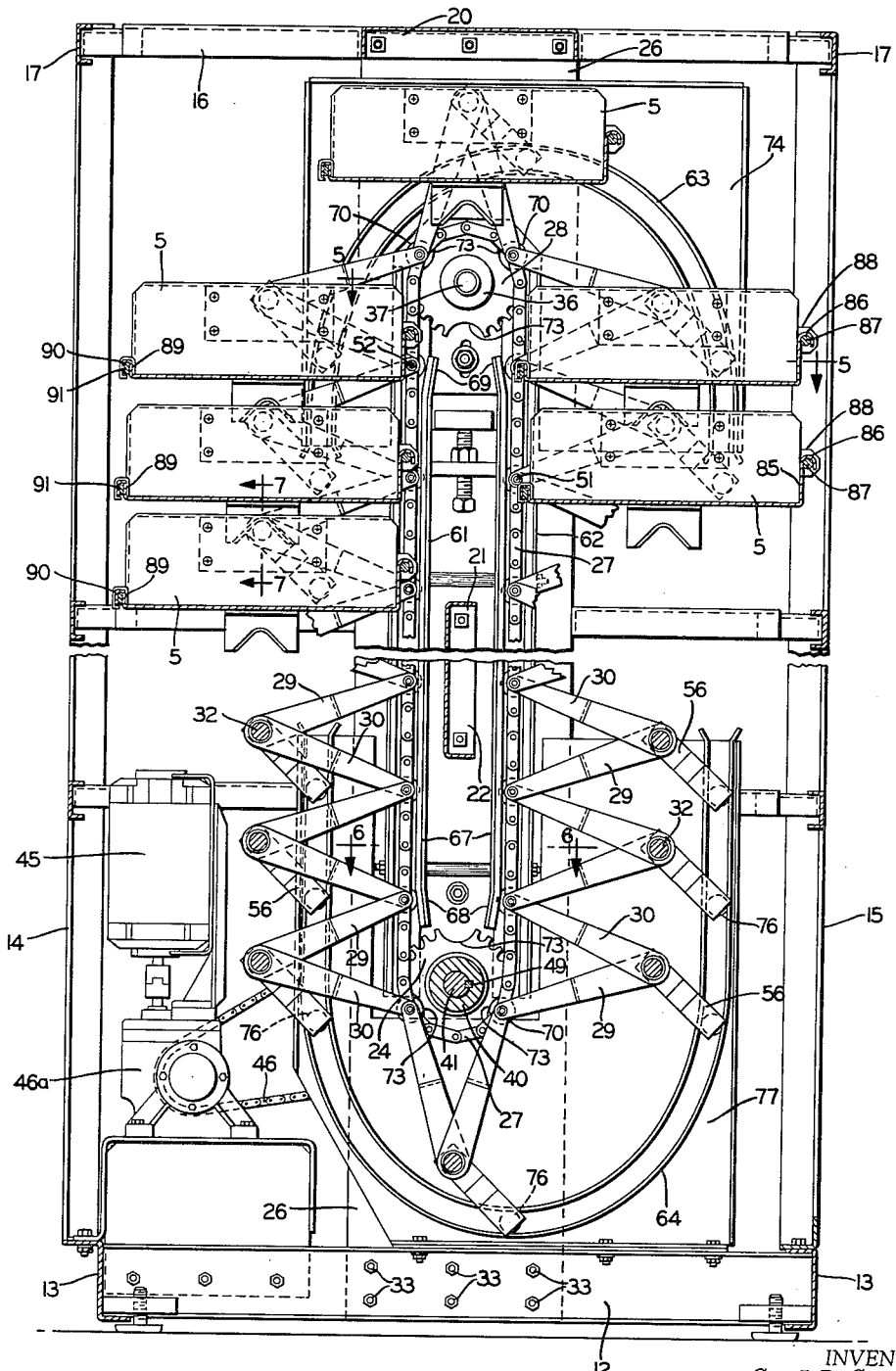
FIG. 3 is a vertical sectional view of the filing appliance taken on the line 3—3 of FIG. 4.

As shown in FIG. 3, each drive chain 27 is disposed over and between the sprockets 24 and 28 which are journally mounted on support sprocket plates 34 and 35, respectively (FIG. 2). The sprocket 28 (FIG. 5) includes a hub 36 and a stub shaft 37 which shaft is mounted in a bearing 38 that is secured on the inner side of a journal mounting plate 35.

The plate 35 is bolted on the outer surface of the channel 26 and the bearing 38 extends through an opening 39 in the plate. Likewise, the sprocket 24 (FIG. 6) has a hub 40 and a stub shaft 41 which extends through a journal mounting 42 in which bearings 43 and 44 are provided for the shaft.

The journal mounting 42 is attached to and extends from opposite sides of the mounting plate 34 which is bolted to the channel 26 where an opening (not shown) is provided for the journal mounting 42.

Drive means for the pans include a reversible motor 45 which is mounted on the frame 13 (FIG. 3). The motor drives a chain 46 through a conventional reduction gear 46a. The chain 46 (FIG. 2) drives a sprocket 47 which, as shown in FIG. 6, is mounted on the outer end of the stub shaft 41.

The drive means for the pans 5 also includes the drive shaft 23 (FIG. 6), which shaft is provided with a sleeve 48 and a key 49 at each end for detachable connection to the inner end portions of the stub shaft 41.

The sprocket 25 (FIG. 2) has a stub shaft 50 which is detachably connected to the sleeve 48 on the shaft 23 in a manner similar to that described for the stub shaft 41. The sprocket 25 differs from the sprocket 24 in that the latter is connected with a drive sprocket 47.

As shown in FIGS. 2 and 3, the chains 27 are tautly disposed over and between their respective sprockets 24, 25, and 28. The pan-support arms 29 and 30 for each pan 5 are mounted in pairs, with the inner ends secured to spaced chain pins 51 and 52 and with their outer ends journally mounted on a shaft portion 53 (FIG. 7) of the trunnion 32 between spacers 54 and 55.

A pan stabilizing arm 56 is also mounted on a squared end 57 of trunnion 32. The arm 56 is retained on the shaft portion 57 by a nut 58.

The trunnion 32 (FIG. 7) extends from and is attached to the pan mounting plate 31 that is detachably mounted by bolts 59 to an end wall 60 of one of the pans 5. The pan support and mounting means 18 and 19 also includes a pair of chain tracks 61 and 62, an upper stabilizing track 63, and a lower stabilizing track 64.

The tracks 61 and 62 (FIGS. 5 and 6) are preferably channel members attached by bolts 65 to the vertical channel 26. Each track 61 and 62 includes similar outer legs 66 and inner legs 67. The upper and lower end portions of the outer legs 66 are vertical. The upper and lower end portions of the inner legs 67, however, are inturned at 68 and 69 (FIGS. 3 and 4) for guiding the chain.

Moreover, each chain 27 includes rollers 70 mounted on the chain pins 51 and 62 to which the arms 29 and 30 are attached. The diameter of the rollers 70 is greater than the width of the links of the chain 27. The rollers 70 are composed of noise deadening or sound absorbing material, such as Delrin (a Du Pont product), which has great resistance to friction plus a low coefficient of friction. As shown in FIGS. 3, 5, and 6 the rollers 70 roll in channels 71 and 72 that are mounted on the legs 66 and 67, respectively, of the chain tracks 61 and 62. Thus, the chains 27 move within the tracks 61 and 62 without metal-to-metal contact and thereby minimizes the amount of noise created. In addition, as the chains move around the sprockets 24 and 28, the larger rollers 70 are seated in large roller-receiving notches 73 which arrangement minimizes friction and noise.

The upper and lower stabilizing tracks 63 and 64 are provided to cooperate with the differently angled stabilizing arms 56 at the two ends of each pan (FIGS. 2 and 3) to prevent tilting of unevenly loaded pans 5 when the pans move around the upper and lower ends of their orbit of travel. The upper track 63 is a channel member mounted on a support plate 74 which is secured by bolts 75 to the upper end portion of the channel 26. The track 63 is arcuate and is adapted to receive a cam roller 76 (FIG. 5) at the outer end of each stabilizing arm 56. As the pans 5 move about the upper end of their orbit of travel, the cam rollers 76 in the tracks 63 prevent any unevenly loaded pan from tilting.

Likewise, the lower stabilizing track 64 is mounted on a plate 77, which plate is secured to the base frame members 12 and 13 (FIG. 3). The track 64 operates in conjunction with the cam rollers 76 to stabilize the pans 5 as they move about the lower end of the orbit of travel.

Reinforcing means for the chain tracks 61 and 62 are provided and they include an elongated shaft 61a on which tubular spacers 61b, 61c, and 61d are provided for maintaining the spacing not only between the tracks but also between the legs thereof. A nut 62a is mounted on each end of the shaft 61a.

In order to stabilize the pans, even with unbalanced loads, each pan is provided with means for engaging the trunnions 32 of the next adjacent pan. Each pan is provided with a bracket or guide 78 (FIGS. 5, 7, 8, and 9) on the undersurface of the pan adjacent each end wall. Each bracket 78 is provided with a down-turned portion 79 and is provided with an inverted V-shaped notch 80. As the pans 5 move into and through the vertical portions or runs of their orbit of travel, the pans are clamped together without relative movement in a stack and in closely spaced relationship. The V-shaped notch, having outwardly inclined edges, operates as a cam follower in contact with the trunnion 32 of the next lower pan.

To facilitate the camming action between the V-notch and the trunnion, a pad 81 of resilient material is provided on the downturned portion 79 of the bracket 78. The pad 81 is held in place by a retainer 82 and bolts 83.

The lower edge of the pad 81 has a notch 84 similar to the V-shaped notch 80 and extends below the notch 80 as shown in FIGS. 7–9, for yielding contact with the trunnion 32.

Inasmuch as the pads 81 silence the contact between the pans as well as slide over the trunnions of the pans until the trunnions move into the vertex of the V-notch, the pads are preferably composed of hard lubricated rubber having a durometer of 75. The lubricant may be graphite which is added to the rubber in its liquid state before it is molded. The lubricant facilitates the sliding action of the trunnions to the vertex of the V-notch. In that manner the pans 5 move vertically with a smooth action and with a minimum of noise.

The plates 31 on which the trunnion 32 is mounted are detachably secured to opposite end walls of the pans 5 by the bolts 59. As shown in FIG. 2, the pans 5 may be dismounted from the pan-mounting means 18 and 19 at opposite ends of the pans by detachment of the four bolts 59.

Assembly or disassembly of the file into subassemblies is further expedited by the use of bolts between the channels 26 and the base-frame members 12, and the stretchers 20, 21, and 22. The drive shaft 23 having a sleeve 48 at opposite ends thereof is likewise readily disengaged from the stub shafts 41 and 50 of the sprockets 24 and 25.

Accordingly, a very large power file may be shipped in subassemblies of greatly reduced size. Each pan means 18 and 19 may be shipped as a subassembly which includes the sprockets and chains 27, the sprocket arms 29 and 30, the trunnions 32, and the plates 31. Upon assembly of the subassemblies, the several pans 5 may be attached to their corresponding plates 31 at opposite ends by the bolts 59.

The weight of each pan 5 may be minimized by using sheet metal material of relatively light gauge. Where the pans 5 are unusually long, the possibility of the pans twisting out of level position may occur due to uneven loading. For that reason, a rear wall 85 of each pan is provided with a downturned bead-like portion 86 in which a reinforcing member or torsion rod 87 is mounted. The torsion rod extends throughout the length of the pan 5 and between end reinforcing members 88. Likewise, a front wall 89 of each pan has a downturned edge portion 90 in which a reinforcing member or torsion rod 91 is provided.

Another embodiment of the pans is generally indicated at 92 in FIGS. 10-12, which pans are provided with a single torsion rod 93 on the undersurface. One rod 93 extends longitudinally and centrally of each pan and between opposite ends thereof. In addition, a pair of reinforcing channels 94 are provided along the bottom of each pan 92 on opposite sides of the bar 93.

Moreover, the pans 92 differ from the pans 5 in that the latter are provided with the brackets 78 and pads 81 on the undersurface of each pan 5. The pans 92 are not provided with such brackets. Rather, the means for mounting and moving the pans 92 include a mounting plate 95 to which each pan 92 is attached by screws 96. A pan bracket or guide 97 is attached to the lower end portion of each plate 95. The bracket 97 has a purpose similar to that of the bracket 78. The lower edge of the bracket 97 has a notch 98 and is provided with a pad 99 of resilient material (similar to the pad 81) for engagement with the upper side of the adjacent trunnions 32 (FIG. 10).

Accordingly, when the pans 92 are shipped as subassemblies separate from the means for mounting and moving the pans, the pan brackets or guides 97 are part of the pan-mounting means instead of the pan, such as the pans 5.

The power filing appliance of the present invention includes improvements over the files of prior construction. It has a threefold objective including (1) shipment of the file as subassemblies in separate containers which subassemblies are easily handled and readily installed on location by the use of screws at each end of each pan, (2) increase the file capacity by elimination of a cross shaft above each pan to reduce the effective height of each pan, and (3) the provision of a smoothly operating unit having a minimum of noise attending its operation.

Associated with the foregoing is the advantage of reducing the weight of the file in order to minimize the weight per square foot of floor area. Torsion resistant means enables this advantage to be obtained in the construction of each pan in order to compensate for any twisting occurring in pans of unusual length due to the use of sheet metal of lighter gauge than was heretofore used.

Another problem solved by the instant file is the use of noise silencing rollers or pads to minimize as much as possible the sources of noise which, with larger power filing appliances extending from the floor to the ceiling of a room, noise must be eliminated to make the file a desirable commodity.

In the foregoing description certain terms have been used for brevity, clearness and understanding, but no unnecessary limitations have been implied therefrom as such words are used for descriptive purposes and are intended to be broadly construed.

Moreover, the embodiments of the improved construction illustrated and described herein are by way of example and the scope of the present invention is not limited to the exact construction shown.

Having now described the invention, construction, operation and use of preferred embodiments thereof and the advantageous, new and useful results obtained thereby; the new and useful power filing appliance and reasonable mechanical equivalents thereof obvious to those skilled in the art are set forth in the appended claims.

What is claimed is:

1. A power filing appliance of a type composed of separable parts for shipment including a plurality of adjacent card-carrying pans having spaced ends with end walls and the pans being movable in a continuous orbit of travel including upper and lower turning portions and intermediate vertical portions; first pan-support means at one end of the pans and including a first vertical support member, vertically spaced chain-support sprockets operably connected to the support member, a continuous chain mounted on the sprockets, a pan-support arm for each pan extending outwardly from and operably connected to the chain, a pan-support trunnion pivotally connected to the outer end of each pan-support arm, a trunnion-mounting plate on the end of each trunnion remote from the arm, pan-stabilizing guide means operably connected to the one end of each pan and operably connected to the first vertical support member for stabilizing the pan at least during the travel of the pan through the upper and lower turning portions of the orbit of travel, and pan-stabilizing bracket means operably connected to the one end of each pan for engaging the trunnion of a next adjacent pan during the travel of the pan through the vertical portions of the orbit of travel; second pan-support means at the other end of the pans and including a second vertical support member, vertically spaced chain-support sprockets operably connected to the vertical support member at levels corresponding to the chain-support sprockets of the first support means, a continuous chain mounted on the sprockets, a pan support arm for each pan extending outwardly from and operably connected to the chain, and a pan-support trunnion pivotally connected to the outer end of each pan-support arm, a trunnion mounting plate on the end of each trunnion remote from the arm, pan-stabilizing guide means operably connected to the other end of each pan and operably connected to the second vertical support member for stabilizing the pan at least during the travel of the pan through the upper and lower turning portions of the orbit of travel, and pan-stabilizing bracket means operably connected to the other end of each pan for engaging the trunnion of a next adjacent pan during the travel of the pan through the vertical portions of the orbit of travel; the pan-stabilizing bracket means having upper and lower ends and having a trunnion-receiving notch in one of said ends; and each trunnion mounting plate being detachably mounted to an end wall of one pan, whereby the first and second pan-support means and the pans constitute separate subassemblies which are packageable for shipment in readily handled containers.

2. The power filing appliance construction of claim 1 in which the first and second pan-support means include chain guide tracks operably connected to said pan-support means co-extensive with the intermediate vertical portions of the orbit of travel of the pans; and in which a plurality of rollers are mounted at spaced intervals on each chain with the rollers having a diameter substantially greater than the width of the chain and being positioned in rolling contact with the chain guide tracks; and in which the rollers are composed of a sound-deadening material.

3. The power filing appliance construction of claim 1 in which trunnion-contacting pads of resilient material are operably connected to each of the pan-stabilizing brackets forming the trunnion-receiving notch.

4. The power filing appliance construction of claim 3 in which the trunnion receiving notches formed on the pan-stabilizing brackets are inverted V-shaped notches defined by downwardly and outwardly extending sides.

5. The power filing appliance construction of claim 3 in which the trunnion-contacting pads are composed of a lubricated rubber composition.

6. The power filing appliance construction of claim 1 in which one of the first and second pan-support means is provided with reversible motor means operably connected to the continuous chain thereof for driving said chain; in which one of the chain-support sprockets of each of the first and second pan-support means on corresponding levels are formed with aligned stub shafts extending toward each other; in which a drive shaft is positioned extending between the stub shafts; and in which telescopic end means are operably connected to the stub shafts and the drive shaft for detachably connecting the drive shaft to the stub shafts and providing a rotatable drive therebetween.

7. The power filing appliance construction of claim 1 in which each pan has two side walls and a bottom wall extending between the spaced end walls; and in which elongated pan-stiffening means are mounted on certain of the side and bottom walls and co-extensive thereof for preventing twisting of the pans out of a level position.

8. Mechanized file construction of the type in which a plurality of pans are mounted by support means movable in a continuous orbit of travel including upper and lower turning portions and intermediate generally vertical portions, in which the pans have ends with end walls, and in which trunnion shaft means are mounted on and project transversely from each of the pan ends and are operably connected to the support means for the movement of the pans in said orbit of travel; the improvements which comprise stabilizing brackets mounted on and projecting downwardly from each of the ends of each of the pans, each of said stabilizing brackets having a downwardly opening notch formed therein and forming a notch undersurface, said stabilizing brackets being constructed and arranged extending downwardly to positions receiving in the notches thereof the trunnion shafts of the pan next below when the pans are in the intermediate generally vertical portions of the orbit of travel, and resilient means on one of said stabilizing bracket notch undersurfaces and trunnion shafts for compressively engaging the other of said undersurfaces and shafts when said shafts are received in said notches.

9. Mechanized file construction as defined in claim 8 in which the resilient means on one of said stabilizing bracket notch undersurfaces and trunnion shafts are composed of a lubricated rubber-like composition.

10. Mechanized file construction as defined in claim 8 in which the stabilizing brackets are formed with laterally spaced downwardly projecting sheet metal members with a resilient rubber-like member secured therebetween; and in which the resilient rubber-like member forms the downwardly opening notch undersurface.

11. Mechanized file construction as defined in claim 8 in which trunnion plates are detachably secured to each of the pan end walls; and in which the trunnion shafts are mounted on and extend laterally from the trunnion plates.

12. Mechanized file construction as defined in claim 8 in which trunnion plates are detachably secured to each of the pan end walls, in which the trunnion shafts are mounted on and extend laterally from the trunnion plates; and in which the stabilizing brackets are secured to the trunnion plates and are detachable with said trunnion plates.

13. Mechanized file construction as defined in claim 8 in which the support means mounting the pans in the continuous orbit of travel includes a pair of continuous laterally spaced chains, means movably mounting one of the chains generally aligned with each of the pan ends, and support arm means operably connecting the pan trunnion shafts to the aligned chains for supporting the pans movable with the chains in said orbit of travel; in which generally U-shaped guide tracks are mounted at least partially telescoping each of the chains with the chains movable along said tracks; in which a plurality of rollers are mounted at spaced intervals on each chain having a diameter substantially greater than the width of the chain and being positioned in rolling contact with that chain guide track; and in which the chain rollers are formed of a sound-deadening material.

14. Mechanized file construction of the type in which a plurality of pans are mounted by support means movable in a continuous orbit of travel including upper and lower turning portions and intermediate generally vertical portions, in which the support means includes a pair of laterally spaced continuous chains mounted generally aligned with and operably connected to ends of the pans movably supporting the pans in said orbit of travel, and in which generally U-shaped cross section guide tracks are mounted at least partially telescoping each of the chains with the chains movable along said tracks; the improvement comprising a plurality of rollers mounted at spaced intervals on each chain having a diameter substantially greater than the width of the chain and being in rolling contact with the chain guide tracks, and the rollers being composed of a sound-deadening material.

References Cited by the Examiner

UNITED STATES PATENTS

| 1,859,874 | 5/32 | James | 198—158 |
| 2,940,810 | 6/60 | Graber | 198—158 |

FOREIGN PATENTS

| 553,760 | 3/57 | Canada. |

SAMUEL F. COLEMAN, *Primary Examiner.*

WILLIAM B. LA BORDE, *Examiner.*

Disclaimer 3,199,658.—*Carl D. Graber*, Orrville, and *Raymond L. Alvarez*, Canton, Ohio. POWER FILING APPLIANCE. Patent dated Aug. 10, 1965. Disclaimer filed Oct. 29, 1970, by the assignee, *Diebold, Incorporated*.
Hereby enters this disclaimer to claim 14 of said patent.
[*Official Gazette March 2, 1971.*]